United States Patent [19]
Larsen

[11] Patent Number: 6,016,841
[45] Date of Patent: Jan. 25, 2000

[54] ACCUMULATOR WITH LOW PERMEABILITY FLEXIBLE DIAPHRAGM

[75] Inventor: Alan R. Larsen, Layton, Utah

[73] Assignee: Autoliv ASP, Inc., Ogden, Utah

[21] Appl. No.: 08/918,905

[22] Filed: Aug. 27, 1997

[51] Int. Cl.$^7$ ................................................. F16L 55/04
[52] U.S. Cl. ................................. 138/30; 267/64.27
[58] Field of Search ........................... 267/64.23, 64.24, 267/64.27; 138/30

[56] References Cited

U.S. PATENT DOCUMENTS

| | | | |
|---|---|---|---|
| 3,208,646 | 9/1965 | Wessenger | 222/386.5 |
| 3,283,786 | 11/1966 | Irwin | 138/30 |
| 3,526,580 | 9/1970 | Webb | 204/20 |
| 3,847,182 | 11/1974 | Greer | 138/30 |
| 3,948,287 | 4/1976 | Sugimura et al. | 138/30 |
| 4,880,213 | 11/1989 | Shinbori et al. | 267/64.27 |
| 5,054,373 | 10/1991 | Brault et al. | 92/92 |
| 5,117,873 | 6/1992 | Miyakawa et al. | 138/30 |
| 5,133,387 | 7/1992 | Pietrykowski et al. | 138/30 |
| 5,215,124 | 6/1993 | Hattori et al. | 138/30 |
| 5,409,041 | 4/1995 | Yoshida et al. | 138/30 |
| 5,524,671 | 6/1996 | Yoshida et al. | 138/30 |

FOREIGN PATENT DOCUMENTS 6430901  7/1987  Japan .

*Primary Examiner*—Robert J. Oberleitner
*Assistant Examiner*—Mariano Sy

[57] ABSTRACT

A gas charged high pressure accumulator includes a hollow housing and a composite flexible diaphragm dividing the interior volume into two leak tight chambers, one of these chambers being adapted to receive hydraulic fluid under pressure and the other chamber containing compressed nitrogen gas. The composite diaphragm is made of only two layers including a first elastic rubber layer facing the fluid chamber and a thin metal layer vapor deposited on the side of the rubber layer facing the gas chamber. The metal deposited film forms a gas impermeable barrier to prevent leakage of the charged gas through the diaphragm into the hydraulic fluid chamber. The surface of the metal film is formed with adjacent scales or plates to enhance the flexibility of the diaphragm, while a continuous metal film is attached underneath to the rubber substrate.

6 Claims, 3 Drawing Sheets

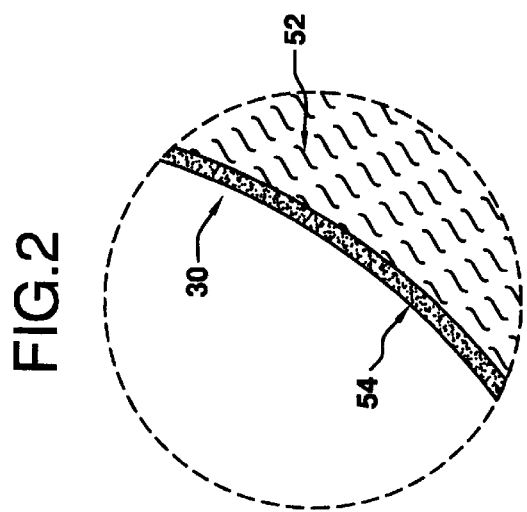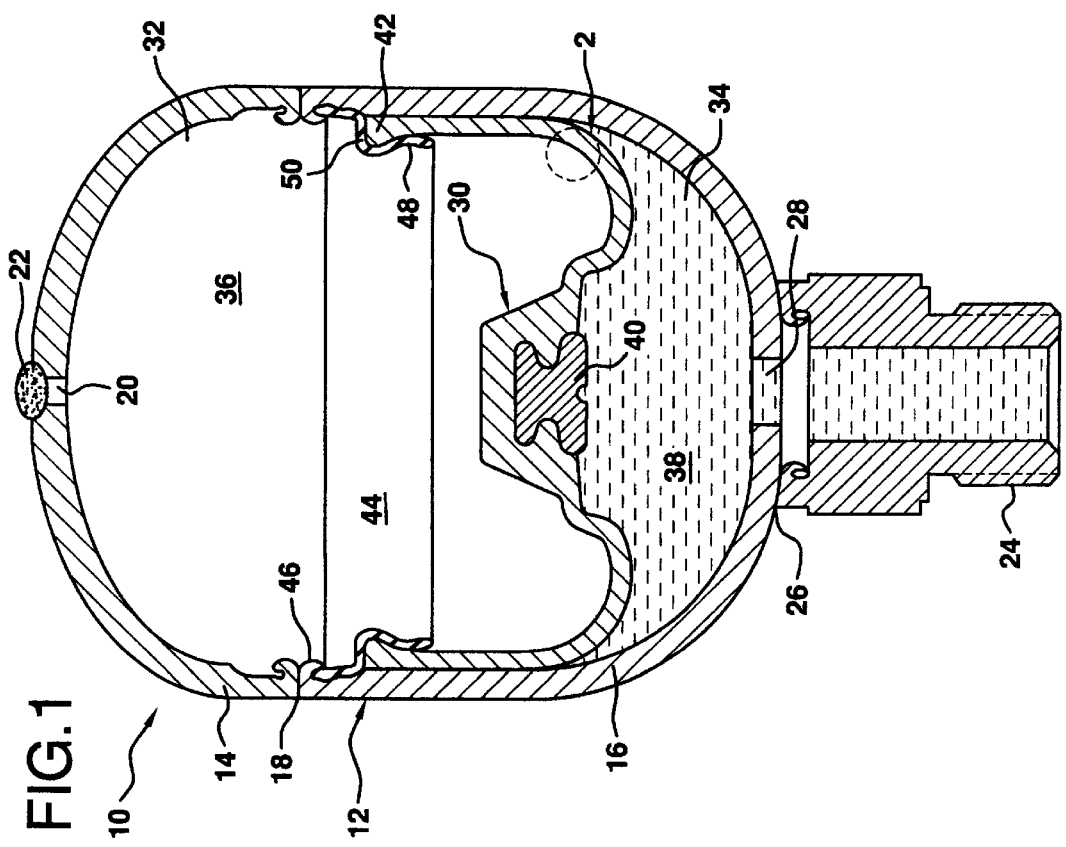

ACCUMULATOR WITH LOW PERMEABILITY FLEXIBLE DIAPHRAGM

FIELD OF THE INVENTION

This invention relates to gas charged accumulators for use in high pressure fluid systems, such as automotive brake systems and other high pressure hydraulic fluid power systems. More particularly, this invention relates to gas charged high pressure diaphragm accumulators utilizing a low permeability flexible diaphragm made of a metallized rubber composite separating the gas chamber from the fluid chamber.

BACKGROUND OF THE INVENTION

High pressure fluid power systems, such as hydraulic systems, employ gas charged accumulators to serve as energy storage devices and/or auxiliary energy sources. The accumulators are designed to reversibly store a working fluid, such as a hydraulic fluid, from the system under pressure against a trapped cushion of highly compressed gas. For example, in hydraulic brake systems of automobiles, accumulators are employed to store hydraulic energy during low volume demands, smooth pressure spikes, and maintain hydraulic pressure during high volume demands.

Various types of gas charged accumulators are known, such as diaphragm-, bladder-, piston- and bellow-type accumulators. In diaphragm accumulators, in particular, a sealed hollow housing is provided. Positioned within the housing is a sheet-like movable diaphragm composed of a flexible material, such as rubber, to subdivide the interior space into two fluid-tight pressure chambers on opposite sides of the diaphragm. One chamber is a fluid chamber into and out of which the working hydraulic fluid of the hydraulic system is accumulated and expelled under pressure when required. The other chamber is charged with a gas, for example, nitrogen gas, under high pressure to act as an energy storage medium. In use, the working fluid accumulates in the fluid chamber and when the fluid pressure exceeds the pressure of the trapped gas, the diaphragm is elastically displaced, further compressing the gas on the other side. The gas is later utilized to expel on demand the stored fluid under pressure out of the fluid chamber back into the hydraulic fluid system.

In the past, it has been difficult to prevent the diffusion of the charged gas contained within the gas chamber through the diaphragm membrane into the fluid chamber containing the hydraulic fluid. Consequently, standard gas charged accumulators tend to gradually lose their charge and require periodic recharging or replacement. Flexible rubber diaphragms, in particular, are notorious for allowing gas to invariably permeate therethrough and dissolve in the hydraulic fluid, increasing the saturated gas levels in the hydraulic fluid and, thus, rendering the relatively incompressible hydraulic fluid compressible. As one will appreciate, this condition dangerously impairs the performance of the hydraulic system concerned, which, in turn, reduces the reliability of the system and increases service frequencies.

Prior attempts have been made to reduce the gas permeability of rubber diaphragms.

U.S. Pat. No. 5,054,373 (Brault et al.) discloses a gas impermeable, flexible, composite membrane for use in a diaphragm accumulator. The composite membrane comprises three adjoining layers of deformable materials sandwiched together, namely a butyl rubber inner layer, a butyl rubber outer layer, and an intermediate layer nested between the inner and outer layers. The intermediate layer is relatively gas impermeable and comprises a pre-formed metal film, such as aluminum foil. This composite diaphragm, however, suffers from a number of drawbacks. For one, the three separate layers add complexity in construction and undesirable bulk to the accumulator diaphragm. In addition, the lack of adhesion between the layers, which are preferably unbonded, does not allow the desired level of impermeability, rendering the layered composite more susceptible to diffusion and leakage of the charged gas. Furthermore, even when the layers are glued together, the differences in elongation between metal and rubber layers cause relatively large shearing forces to act on the adhered surfaces upon repeated diaphragm displacement, which, in turn, cause delamination and increased gas permeability. The pre-formed metal layer also renders the diaphragm less flexible and durable and more susceptible to destructive deformations. Moreover, there is a tendency for the fatigue-type cracks and fissures induced in the metal layer by flexure to be held permanently open by the opposing fluid pressure acting on the outer rubber layers, even after the diaphragm has returned to a relaxed state. For the foregoing reasons, an accumulator of this kind has only a limited service life. U.S. Pat. No. 5,117,873 (Miyakawa et al.) teaches another sandwiched together rubber-metal foil-rubber composite diaphragm, similar to the one described above, but further showing various ways to reduce gas permeability and leakage through the joint created between the inner wall of the housing and the peripheral edge of the diaphragm.

Recent emphasis on improving the durability of composite diaphragms, especially in cold weather, have resulted in substitutions of the intermediate metal film with more flexible materials made from laminated sheets of gas-impervious synthetic resin films, as shown in U.S. Pat. No. 5,215,124 (Hattori et al.) and U.S. Pat. No. 5,409,041 (Yoshida et al.). U.S. Pat. No. 5,524,671 (Yoshida et al.) discloses another composite membrane for a diaphragm accumulator having sandwiched between the two outer rubber layers, an intermediate layer composed of multiple synthetic resin films laminated together through an adhesive along with an aluminum deposited film interposed between laminated resin layers for enhanced gas barrier performance. Flexible diaphragms made of molded resinous materials, however, tend to be more susceptible to chemical attack by the system fluids, such as brake fluids. Hardening and cracking of the diaphragm upon immersion in the working fluid due in part to plasticizer leaching tends to destroy the gas impermeability of the diaphragm.

What is needed is an accumulator which has a new and improved movable flexible diaphragm that is simple in construction, is essentially impervious to gas diffusion and essentially leak-tight, is not susceptible to chemical attack and deterioration by the system fluids, still maintains high flexibility and volumetric displacement capacity over a wide range of operating temperatures, is able to withstand repeated displacement without creating permanent voids, fatiguing, separating, or delaminating, is reliable and durable and has a long service life, and does not require recharging or frequent servicing.

SUMMARY OF THE INVENTION

It is, therefore, an object of this invention to provide an accumulator which does not suffer from the foregoing drawbacks.

It is another object of this invention to provide a composite membrane for a diaphragm accumulator whereby the tendency for gas diffusion into the fluid chamber is essentially eliminated, thus reducing service frequencies and increasing system reliability.

It is another object of this invention to provide a composite membrane for a diaphragm accumulator which still maintains the required flexibility and volumetric displacement capacity, and is able to withstand repeated displacement without creating permanent voids or fatiguing.

Yet another object of this invention is to provide a composite membrane for a diaphragm accumulator that is resistant to separation and delamination when exposed to shearing forces acting on the adhered surfaces during repeated mechanical cycling.

Still another object of this invention is to provide a composite membrane for a diaphragm accumulator that is resistant to chemical attack upon immersion in the system fluids.

And still another object of this invention is to provide a diaphragm accumulator having a composite membrane which is possessed of a minimum number of parts, is economical in manufacture, easy to assemble, is durable and reliable, and has an extended service life.

Still another object of this invention is to provide a composite membrane for a diaphragm accumulator composed of a metallized rubber composite wherein the metal layer substantially eliminates diffusion of the charged gas and yet still maintains excellent flexibility and durability.

And another object of this invention is to provide a composite flexible membrane for a diaphragm accumulator formed of two superimposed layers, a first flexible single rubber layer and a second flexible, gas impermeable, single metal layer which is vapor deposited on the side of the rubber layer facing the charged gas, wherein the metal-deposited layer forms an integral skin on the rubber which exhibits extremely low gas permeability, yet still has desired flexibility and is able to withstand repeated mechanical biasing without degrading, flaking, peeling-off, fatiguing, creating permanent voids, and ultimately losing its gas impermeability.

To achieve these and other objects, according to the present invention, there is provided an accumulator comprising a sealed hollow housing defining a pressure vessel having a working fluid inlet port connectable to a high pressure fluid system, and a movable, flexible, composite diaphragm or membrane dividing the interior of the housing into a gas chamber for containing a gas, such as nitrogen, under pressure and a fluid chamber for accumulating a working fluid, such as hydraulic fluid or brake fluid, under pressure from the exterior of the housing through the working fluid inlet port communicating with the fluid chamber. The gas chamber is charged with gas through a gas fill port communicating with the gas chamber, with the fill port being subsequently sealed with a plug. The peripheral edge of the diaphragm is clamped to the housing for providing a fluid tight seal between the two chambers.

The flexible composite diaphragm is characterized by being a gas impermeable, thin, flexible composite body including a first layer composed of an elastic material, such as rubber, and a second layer composed of a relatively gas-impermeable metal material, such as aluminum, which is deposited, such as vapor deposited, on at least one surface of the first layer, so as to form a thin integral skin or single film bonded on the first layer. The second layer is preferably deposited on only one surface of the first layer for simplicity and even more preferably on only the surface facing the gas chamber for lowest permeability. An optional liquid sealer, adhesion enhancer, or cleaner may be coated over the rubber layer a prior to metal deposition to reduce outgassing of the rubber during metal deposition.

The stand alone thin metal-deposited film ultimately formed on the rubber layer is advantageously provided with a platy surface which is desirably exposed to the charged gas within the gas chamber. The deposited film develops cracks upon flexure that close again when relaxed to produce the platy surface. The exposed platy metallic surface improves the flexibility of the diaphragm, while preventing the metal layer from flaking, peeling-off, separating, permanently voiding, fatiguing, and otherwise deteriorating upon repeated diaphragm displacement. And despite its platy skeletal structure, the metal-deposited film remains essentially continuous, especially along the rubber-to-metal bond interface, even during flexure, so as to provide the required barrier to gas diffusion. The integral metallic skin thus creates a gas impermeable barrier on the rubber without detracting from the required flexibility and durability during cycling.

The aforesaid and other objects, features and advantages of this invention will become more apparent from the following description and the appended claims.

BRIEF DESCRIPTION OF THE DRAWINGS

With this description of the invention, a detailed description follows with reference to the drawings, in which like reference numerals denote like elements, and in which:

FIG. 1 is side sectional view of a new and improved diaphragm accumulator according to the present invention, showing the accumulator in a working condition, wherein a working fluid has accumulated inside the accumulator against a new and improved flexible low permeability composite diaphragm according to the present invention;

FIG. 2 is an enlarged view of the encircled portion in FIG. 1 indicated by numeral ②, showing the new and improved flexible low permeability composite diaphragm according to the present invention;

Figure 3:
FIG. 3 is an SEM of one embodiment of the new and improved flexible low permeability composite diaphragm according to the present invention composed of a thin aluminum film vapor deposited on one side of a sheet of EPDM rubber, showing the platy surface of aluminum film produced after flexure; and, FIG. 4 is an elemental spectral analysis of the platy aluminum surface of the flexible low permeability composite diaphragm of FIG. 3.

It should be understood that there are shown in the aforesaid drawings certain exemplary embodiments of the invention as presently preferred. The invention is not limited to these embodiments and is capable of variation within the spirit and scope of the appended claims.

DETAILED DESCRIPTION OF THE
PREFERRED EMBODIMENTS OF THE
INVENTION

Referring now to the drawings, FIG. 1 shows a gas charged high pressure diaphragm accumulator 10 according to a preferred embodiment of the present invention. The accumulator 10 may be used in hydraulic brake systems for automobiles, for example, in anti-lock brake control devices. As shown in FIG. 1, the accumulator 10 includes a hollow, substantially spherical housing 12 formed with two shells 14, 16 abutting up against each other and fastened together along a circumferential inertia weld 18. The upper shell 14 forms a lid and the lower shell 16 forms a base. Upper and lower shells can be made from carbon steel or stainless steel stampings or forgings, or aluminum for lighter weight.

The housing 12 has a gas inlet port 20 defined in the top wall of the lid 14. The gas inlet port 20 is used to charge a pressurized gas in the housing, with the gas inlet port 20 being sealed with a plug 22, such as a ball weld, to prevent leakage after charging. The housing also has a fluid inlet pipe 24 attached, by a circumferential weld 26, to a working fluid inlet port 28 defined in the bottom wall of the base 16. The fluid inlet pipe 24 is adapted for connection to a hydraulic fluid circuit (not shown) so as to permit flow of the system fluid into the housing.

A flexible composite membrane or diaphragm 30 is mounted across the interior space of the housing 12. The diaphragm 30 divides the interior volume into two distinct leak-tight pressure chambers 32, 34. The upper chamber 32 positioned at the side of the gas inlet 20 serves as the gas chamber into which an inert gas 36, such as argon or nitrogen, is sealingly charged to a predetermined high pressure by way of gas inlet port 20. The inert gas is usually pressurized between about 1,200 and about 3,000 psi. The inert gas can also include a small percentage of helium or other trace element to facilitate leak detection. The lower chamber 34 positioned opposite the gas chamber 32 at the side of the fluid inlet 28 serves as the fluid chamber into which the working fluid 38, such as a hydraulic fluid or brake fluid, passing through the inlet pipe 24 under pressure is accumulated within the housing.

Frequently, in high pressure fluid systems, the working fluid 38 will be drawn nearly completely out of the fluid chamber 34 under the influence of the pressure within the gas chamber 32. This causes the diaphragm 30 to bottom out against the lower wall portion of the base 16. The downward stresses acting on the diaphragm 30 are often great enough to destructively extrude the diaphragm through the fluid inlet port 28. A plug 40 is thus mounted to the central portion of the diaphragm 30 facing the fluid chamber 34, to prevent the diaphragm from extruding through or blocking the fluid inlet port 28 when deflected downwardly into the fluid chamber 34.

The diaphragm 30 also has a peripheral edge 42 pressed against the inner wall surface of the housing 12 by a resilient retainer 44 fixed to the housing. The retainer 44 includes a free upper end secured to the inner housing wall using lower weld flashing 46 and a depending lower portion comprising a downwardly extending tubular channel 48. The tubular channel 48 downwardly and outwardly tapers slightly towards the inner housing wall surface, so as to positively clamp therein an enlarged head portion 50 of the diaphragm 30 formed along the upper peripheral edge 42. A leak-tight connection is, thus, formed at the joint connecting the peripheral edge 42 of diaphragm against the inner wall surface of the housing 12, thereby preventing the charged gas in the gas chamber 32 from leaking around the edges of the diaphragm 30 into the fluid chamber 34.

As shown in FIG. 2, the flexible diaphragm 30 is a composite, gas-impermeable, sheet-like membrane which is constructed of two adjoining elastically deformable layers. A first layer 52 serves as the main elastic layer and is composed of an elastic material, such as rubber, molded into the required diaphragm shape. For example, the rubber may consist of nitrile rubber, butyl rubber, styrene rubber, chloroprene rubber, and/or ethylene-propylenediene (EPDM) rubber, although EPDM rubber is most preferred. The rubber layer typically has a thickness between about 1,270 and about 2,540 μm. The second layer 54 which serves as the gas-impermeable layer is affixed to the surface of the first layer 52 on the side facing the gas chamber 32. The second layer 54 is composed of a gas-impermeable material, such as a metal film. The metal film may consist of aluminum, titanium, antimonytin, and other metals and alloys, including corrosion resistant metals and alloys, although aluminum is most preferred. The metal layer is composed of a single, stand alone, layer of metal, instead of complex multiple, built up, dissimilar metal layers as encountered in gas impermeable composite membranes of the prior art, such as those shown in U.S. Pat. No. 3,526,580 (Webb). The metal layer typically has a thickness between about 2 and about 8 μm. The two layers 52, 54 have substantially identical circular shapes. Because of the metallic second layer 54, the composite diaphragm 30 as a whole is essentially impermeable to the flow of gas therethrough. Yet, the diaphragm 30 still has excellent elastic flexibility as a whole, even with a metal layer 54 being affixed onto the rubber layer 52.

It should be understood that the metal layer 54 can be affixed to the side of the rubber layer 52 facing the fluid chamber 34, although this embodiment is less desirable, since some leakage through the edges of the diaphragm 30 could occur. Also, the metal layer 54 can be applied to both sides of the rubber layer 52, although this embodiment is less desirable due to increased complexity and cost. From the aforesaid description, other embodiments will become apparent to those skilled in the art, yet the two-layer embodiment described in the preceding is the most preferred.

In this invention, the metal layer 54 is formed in situ over the rubber layer 52 using known metal film deposition techniques, commonly referred to as metallization techniques. The metal layer of the composite membrane of this invention is, therefore, grown as an integral skin on the rubber layer. This contrasts with the methods used in the prior art wherein a metal film is pre-formed and then sandwiched together, with or without adhesives, between opposing rubber layers. The integral formation of single metal layer on a single rubber layer, however, has a number of advantages over prior art constructions, which are more fully discussed hereinafter.

Different kinds of known deposition techniques may be used in the present invention for metallizing the rubber layer 52. Examples of suitable metal deposition techniques include low temperature vacuum coating, such as evaporative or vapor metal deposition, sputtering, and ion plating, as well as any other low temperature metal deposition methods.

In the embodiment shown in FIGS. 1–2, the composite diaphragm 30 comprises an EPDM rubber layer 52 coated on the side facing the charged gas 36 in the gas chamber 32 with a thin stand alone aluminum vapor deposited film layer 54. Vapor deposition, in particular, is a simple and economical low temperature vacuum coating technique.

Generally with vacuum coating, the coating metals and metal compounds are transferred to the vapor state by a thermal or ballistic process and expelled from the vapor source into a high-vacuum environment towards the surface of the substrate to be coated. With vapor deposition, in particular, the metal, in this case, aluminum, is evaporated from a standard vapor source, such as an induction, resistance or electron beam heating spray gun, and expelled therefrom in the vapor state inside the vacuum chamber housing the substrate, in this case, EPDM rubber, to be coated. The evaporating metal atoms are directed to impinge against the desired surface of the substrate, so as to condense to solid thereon and form a continuous metal coating permanently bonded to the substrate.

During vapor deposition, rubber substrates generally have a tendency to outgas when exposed to the metal vapors. This can cause permanent voids and discontinuities in the deposited metal film down to the substrate, which is undesirable. It is, therefore, preferred to treat the surface of the rubber with a standard rubber sealer, adhesion promoter, or rubber cleaner, prior to metal deposition. The amount of outgassing is thereby reduced to insignificant levels and the overall metal-to-rubber bonding is improved. Suitable rubber pretreatment coatings of the aforesaid kind are available from Summit Coating.

As previously mentioned, formation of a composite metallized rubber diaphragm 30 by deposition of a stand alone metal film onto a rubber substrate and leaving one side of the metal film directly exposed to the charged gas 36 and/or working fluid 38 has a number of advantages over prior art sandwich constructions. For one, a continuous integral metal skin which is permanently bonded across the coated rubber surface is initially provided. The excellent metal-to-rubber bond created during deposition is able to provide better resistance to the shearing forces acting on the adhered surfaces, thereby preventing separation and delamination of the adhered surfaces during repeated mechanical cycling. Furthermore, it has been surprisingly discovered by the present inventors that the integral metal skin grown on the rubber surface during deposition forms a mechanical bond to rubber that is stronger than the bond to itself. This enables the exposed metal skin to crack when flexed and develop adjacent scales or plates in its structure, especially across its upper lamina, which readily pull apart when the composite is flexed and come together when released.

The scaly or platy surface of the metal film layer therefore provides the diaphragm with enhanced flexibility and durability, since the metal film can readily bend, slip around, pull apart, and then come back together when relaxed, like a snake skin, especially at its upper surface region upon repeated diaphragm displacement during normal cycling, while still being adhered to the rubber surface as a continuous film to prevent diffusion. Accordingly, the composite membrane has superior flexibility to withstand repeated mechanical displacement without having the metal-deposited barrier layer degrading, flaking, peeling-off, fatiguing, and ultimately losing its gas impermeability. In addition, the generation of permanent voids in the metal layer is essentially eliminated, since the metal layer is not sandwiched between outer rubber layers as in prior art diaphragms. Diffusion of gas contained in the gas chamber into the fluid chamber is thereby prevented. As a consequence, the need for recharging and servicing the accumulator is eliminated. The enhanced flexibility also avoids the generation of permanent wrinkles and other destructive deformations in the metal film, ensuring excellent durability and extended life. Moreover, the composite diaphragm can be subjected to a relatively increased amount of displacement, thus providing the accumulator with an increased accumulating capacity. Finally, the two-layer composite diaphragm of the present invention is simple in construction, possessed of a minimum number of parts, easy to assemble and low in cost.

It is preferred that the composite diaphragm 30 is supported at prefill generally against the lower wall of the base 16 and is not allowed to stretch measurably during the assembly process. It is also preferred that the diaphragm is provided in relative compression during normal accumulator operation to keep the amount of stretching down to a minimum.

Referring again to FIG. 1, the operation of the accumulator 10 will now be described. The gas charged accumulator 10 is first connected to the hydraulic fluid circuit (not shown) through the working fluid pipe 24. Then, the composite diaphragm 30 is repeatedly biased downwardly under the pressure of the inert gas 36 filled in the gas chamber 32, thus maintaining the working fluid 38 reliably and stably under pressure in the fluid chamber 34. A large inflow of the working fluid 38 into the fluid chamber 34 causes the composite diaphragm 30 to be displaced upwardly as the working fluid pressure exceeds the charging gas pressure. This expands the fluid chamber and further compresses the charged gas in the gas chamber on the other side of the diaphragm. The diaphragm 30, thus, serves as a spring for maintaining the working fluid 38 under pressure in the fluid chamber 34. A large outflow of the working fluid 38 from the fluid chamber 34 causes the diaphragm 30 to be displaced downwardly towards the lower wall portion of the base 16. This reduces the gas pressure in the gas chamber and forces the working fluid under pressure from the accumulator into the fluid circuit. As the working liquid 38 is nearly exhausted from the fluid chamber 34, the plug 40 mounted centrally on the side of the rubber layer facing the fluid chamber serves to prevent the diaphragm 30 from being forced into the working fluid inlet 28.

The invention will now be further clarified by a consideration of the following example, which is intended to be purely exemplary of the invention. The example contains an experimental result for a composite diaphragm fabricated according to the present invention and which may be employed in a high pressure gas charged accumulator.

EXAMPLE

Vapor Deposited Aluminum-Rubber Composite Diaphragm

Figure 4:
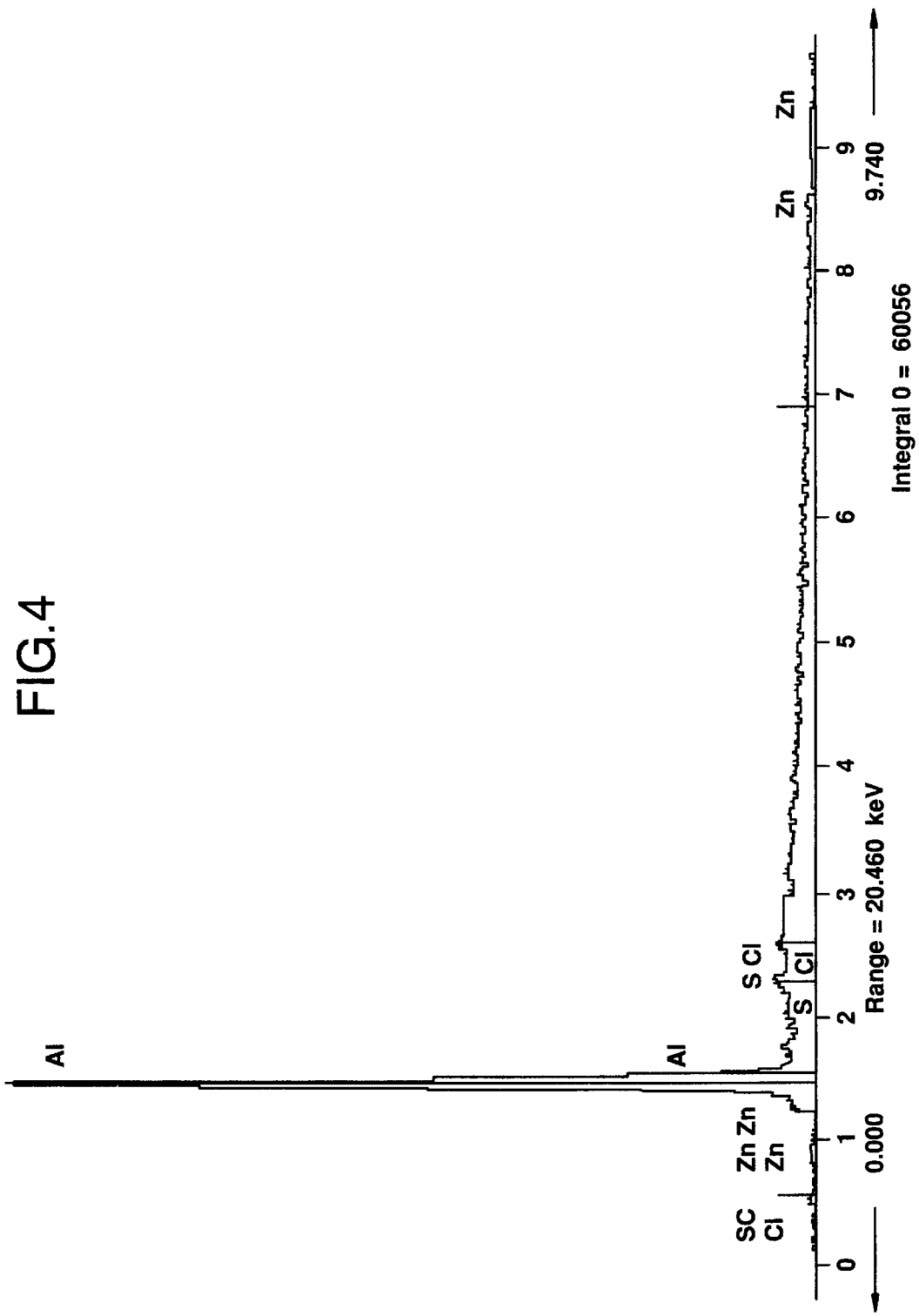

A thin film of aluminum metal having a thickness of about 3 μm was vapor deposited on one side of a sheet-like rubber substrate composed of EPDM rubber having a thickness of about 2,000 μm in a vacuum chamber at a temperature below about 250° F. The rubber had previously been baked, degassed, and sealed prior to vapor deposition. The metallized EPDM rubber composite membrane after first flexure developed cracks and produced a platy yet continuous aluminum-deposited film (resembling a snake skin) affixed to one side of the rubber. FIG. 3 shows the platy surface finish of this aluminum-deposited film bonded to the EPDM rubber substrate. An elemental spectral analysis was performed on the cracked surface region of the aluminum-deposited film shown in FIG. 3. The spectral analysis shown in FIG. 4 reveals that the aluminum-deposited film has a continuous gas impermeable covering despite its platy appearance. This sheet-like composite membrane was conditioned to −40° F. and allowed to return to ambient temperature. It was then clamped between two plates, one having a pressure inlet and the other having a three inch diameter hole through the plate. Air pressure was applied to one side of the membrane to force it to bulge through the three inch diameter hole. Sufficient pressure was used to deflect the membrane about 0.40 inch at the apex of the bulge. This flexure was repeated 500,000 times at ambient temperature. The sample was viewed with a scanning electron microscope before and after mechanical cycling. No damage was observed; namely, no scale flaking, tearing or permanent cracking or voiding occurred. The membrane was also deemed essentially gas impermeable. The composite membrane was also subjected to a standard test method for measuring adhesion by tape test (ASTM D 3359-95a). The test sample recorded a 5B adhesion, that is, no peeling or removal was found after the test.

From the foregoing it will be seen that this invention is one well adapted to attain all ends and objects hereinabove set forth together with the other advantages which are apparent and which are inherent to the structure. Since many possible variations may be made of the invention without departing from the scope thereof, the invention is not intended to be limited to the embodiments disclosed, which are considered to be purely exemplary. Accordingly, reference should be made to the appended claims to assess the true spirit and scope of the invention, in which exclusive rights are claimed.

What is claimed is:

1. An accumulator, comprising:

a hollow housing; and, a flexible membrane sealingly secured within said housing dividing the interior space of said housing into two fluid chambers on opposite sides of a diaphragm, a gas chamber for containing a gas under pressure and a fluid chamber for accumulating a working fluid under pressure from outside said housing through an inlet port communicating with said fluid chamber;

said flexible membrane being a composite body comprising a first layer composed of an elastic material and a second layer composed of a relatively gas impermeable metal material deposited on at least one surface of said first layer so as to form an integral skin on said first layer, said second layer having a platy surface to facilitate flexing of said membrane, while being substantially continuous along the interface with said first layer.

2. A diaphragm accumulator, comprising:

a hollow housing having a working fluid inlet port;

a flexible diaphragm sealingly secured within said housing dividing the interior space of said housing into a gas chamber containing a gas under pressure and a fluid chamber for accumulating a working fluid from the exterior of said housing through said working fluid inlet port communicating with said fluid chamber;

said flexible diaphragm being a composite body comprising a first layer composed of an elastic material and a second layer composed of a relatively gas-impermeable metal material deposited on one surface of said first layer so as to form an integral skin on said first layer and wherein said first layer is coated with a liquid sealer or adhesion enhancer prior to vapor deposition.

3. A diaphragm accumulator, comprising:

a hollow housing having a working fluid inlet port;

a flexible diaphragm sealingly secured within said housing dividing the interior space of said housing into a gas chamber containing a gas under pressure and a fluid chamber for accumulating a working fluid from the exterior of said housing through said working fluid inlet port communicating with said fluid chamber;

said flexible diaphragm being a composite body comprising a first layer composed of an elastic material and a second layer composed of a relatively gas-impermeable metal material deposited on one surface of said first layer so as to form an integral skin on said first layer, and said second layer having a platy surface to facilitate flexing of said membrane, while being substantially continuous at the interface with said first layer.

4. A composite low permeability flexible membrane for a diaphragm of an accumulator, comprising:

a first layer composed of an elastic material;

a second layer composed of a relatively gas-impermeable metal material deposited on one surface of said first layer so as to form an integral skin on said first layer wherein said first layer is comprised of a rubber material selected from the group consisting of nitrile rubber, butyl rubber, styrene rubber, chloroprene rubber, and EPDM rubber.

5. A composite low permeability flexible membrane for a diaphragm of an accumulator, comprising:

a first layer composed of an elastic material;

a second layer composed of a relatively gas-impermeable metal material vapor deposited or sputtered on one surface of said first layer so as to form an integral skin on said first layer wherein said first layer is coated with a liquid sealer, adhesion enhancer, or cleaner prior to metal deposition.

6. A composite low permeability flexible membrane for a diaphragm of an accumulator, comprising:

a first layer composed of an elastic material;

a second layer composed of a relatively gas-impermeable metal material deposited on one surface of said first layer so as to form an integral skin on said first layer wherein said second layer has a platy surface to facilitate flexing of said membrane, while being substantially continuous at the interface with said first layer.

* * * * *